(12) United States Patent
Chiu et al.

(10) Patent No.: US 8,896,705 B2
(45) Date of Patent: Nov. 25, 2014

(54) MEASURING DEVICE AND ASSOCIATED METHOD FOR MEASURING RESPONSE SPEED OF DISPLAY PANEL

(75) Inventors: Chih-Chiang Chiu, Hsinchu County (TW); Tien-Hua Yu, Hsinchu County (TW); Wen-Cheng Wu, Hsinchu County (TW)

(73) Assignee: MStar Semiconductor, Inc., Hsinchu County (TW)

( * ) Notice: Subject to any disclaimer, the term of this patent is extended or adjusted under 35 U.S.C. 154(b) by 140 days.

(21) Appl. No.: 13/590,493

(22) Filed: Aug. 21, 2012

(65) Prior Publication Data

US 2013/0300878 A1 Nov. 14, 2013

(30) Foreign Application Priority Data

May 9, 2012 (TW) .............................. 101116572 A

(51) Int. Cl.
*H04N 17/00* (2006.01)
*H04N 17/02* (2006.01)

(52) U.S. Cl.
USPC ........... 348/187; 348/180; 348/184; 348/194; 348/236; 348/237; 348/254; 348/227.1; 348/230.1; 348/300; 348/340; 348/423.1; 348/425.4; 348/464; 348/495; 348/500; 348/513; 348/515; 348/516; 348/521; 348/540; 348/547; 348/569; 348/602; 348/658; 348/687; 348/671; 348/705; 348/706; 348/707; 348/708; 348/719; 345/107; 345/158; 345/165; 345/169; 345/207; 345/213; 345/214; 345/502; 345/505; 345/520

(58) Field of Classification Search
USPC ................. 348/187, 180, 194, 237, 719, 184, 348/227.1, 230.1, 236, 254, 300, 340, 348/423.1, 425.4, 464, 495, 500, 513, 515, 348/516, 521, 540, 547, 569, 602, 658, 671, 348/687, 705, 706, 707, 708; 345/207, 107, 345/158, 165, 169, 213, 214, 502, 505, 520
See application file for complete search history.

(56) References Cited

U.S. PATENT DOCUMENTS

| | | | | |
|---|---|---|---|---|
| 7,936,347 B2 * | 5/2011 | Furukawa et al. | ............ | 345/207 |
| 2004/0088461 A1 * | 5/2004 | Shimomura | ................... | 710/260 |
| 2004/0189624 A1 * | 9/2004 | Pasqualini et al. | ............ | 345/204 |
| 2009/0096745 A1 * | 4/2009 | Sprague et al. | ............... | 345/107 |
| 2009/0251579 A1 | 10/2009 | Schrey et al. | | |

(Continued)

FOREIGN PATENT DOCUMENTS

TW 200824428 A 6/2008

OTHER PUBLICATIONS

Taiwan Intellectual Property Office, "Office Action", May 9, 2014.

*Primary Examiner* — Jefferey Harold
*Assistant Examiner* — Mustafizur Rahman
(74) *Attorney, Agent, or Firm* — WPAT, PC; Justin King

(57) ABSTRACT

A measuring device for measuring a response speed of a display panel is provided. The measuring device includes a microcontroller and at least one photo sensor. The microcontroller provides a control command, according to which a display controller of the display panel provides test pattern to the display panel. The photo sensor senses a test frame displayed corresponding to the test pattern by the display panel, and provides a corresponding sensing signal associated with brightness and a response signal. According to the response signal, the response speed of the display panel is calculated.

17 Claims, 2 Drawing Sheets

(56) References Cited

U.S. PATENT DOCUMENTS

| | | | |
|---|---|---|---|
| 2010/0164923 A1* | 7/2010 | Furukawa et al. | 345/207 |
| 2010/0321376 A1* | 12/2010 | Takatori | 345/214 |
| 2011/0063341 A1 | 3/2011 | Knicely et al. | |
| 2012/0032969 A1* | 2/2012 | Sugiyama | 345/589 |
| 2012/0038677 A1* | 2/2012 | Hiroi et al. | 345/660 |

* cited by examiner

MEASURING DEVICE AND ASSOCIATED METHOD FOR MEASURING RESPONSE SPEED OF DISPLAY PANEL

This application claims the benefit of Taiwan application Serial No. 101116572, filed May 9, 2012, the subject matter of which is incorporated herein by reference.

BACKGROUND OF THE INVENTION

1. Field of the Invention

The invention relates in general to a measuring device and associated method for measuring a response speed of a display panel, and more particularly, to a high-performance and low-cost measuring device and associated method for measuring a response speed of a display panel.

2. Description of the Related Art

A display panel, e.g., a liquid-crystal display (LCD) panel, is a core component in an audiovisual product, such as a monitor, display device, and a television for presenting images. A display controller in an audiovisual product provides frame data to the display panel according to content of the frame to be displayed, and drives the display panel to display the frame. To ensure quality of the displayed frame, characteristics of a display panel need to be measured to facilitate the display controller in compensating various characteristic defects of the display panel. A response speed is one of the crucial display panel characteristics. For example, as a display panel switches from one frame to the next frame while displaying dynamic images, persistence of vision is likely to be incurred to degrade the display quality if the response speed of the display panel is too low. Such response speed defects can be effectively compensated by adopting an overdrive technique. However, a response speed of a display panel must be learned before deciding a precise compensation level in order to properly correct. Therefore, a solution for accurately measuring a response speed of a display panel has become a research topic of modern information developers.

However, no satisfactory solution for measuring a response speed of a display panel is yet available in industry. To measure a response speed of a display panel, the display panel is necessarily controlled (forced) to switch between test patterns in different grayscales, and actual frame quality (e.g., brightness) presented by the display panel is measured. In conventional solutions, the two key operations of "display panel control" and "frame quality measuring" cannot be effectively integrated. Further, as applications of three-dimensional (3D) images become more prevalent, a frame rate of a display panel is also ever-increasing to deliver these higher end functions. Hence, to measure a response speed of a display panel operating at a high frame rate, a display panel needs to switch between different test patterns at a matching frame rate—such a requirement is hard to be realized with current techniques being used in the art.

SUMMARY OF THE INVENTION

The invention is directed to a preferred solution for measuring a response speed of a display panel. The solution of the present invention not only effectively integrates display panel control and frame quality measurement, but is also applicable to measuring a response speed under a high frame rate.

According to an object the present invention, a measuring device for measuring a response speed of a display panel is provided. The display panel is coupled to and controlled by a display controller. The measuring device comprises a microcontroller, one or more photo sensors, a signal amplifier, and a converter. The microcontroller, coupled to the display controller, provides a control command to the display controller according to a test command, such that the display controller provides a test pattern to the display panel according to the control command. The test pattern is associated with a test frame. In one embodiment, the control command prompts the display controller to automatically provide a plurality of test pattern in different grayscales in a periodical and alternate manner. The photo sensor senses the test frames associated with the test pattern on the display panel, and provides a corresponding sensing signal. The sensing signal is associated with brightness and a response signal. The signal amplifier is coupled to the photo sensor, and adjusts a size of the sensing signal to generate a first signal. The converter, coupled between the signal amplifier and the microcontroller, converts the first signal to a second signal and transmits the second signal to the microcontroller. The microcontroller provides a corresponding measurement result according to the second signal. The first and second signals may respectively be an analog signal and a digital signal, and the converter may be an analog-to-digital converter (ADC).

In one embodiment, when the display controller sends a test pattern to the display panel, the display controller may together send an interrupt signal for indicating a timing of the test frames. That is, the interrupt signal is associated with the timing of the test pattern and is for synchronizing the measuring device and the display controller. The microcontroller may receive the interrupt signal via the display controller.

In one embodiment, the measuring device comprises multiple photo sensors for sensing a frame displayed by the display panel and providing corresponding sensing signals. For example, different photo sensors may sense the brightness at different positions of a same panel. The measuring device may further comprise a multiplexer. The multiplexer, coupled between the photo sensors and the signal amplifier, selectively associates one of the sensing signals of the photo sensors to the response signal, such that the response signal is transmitted via the signal amplifier and the converter to the microcontroller. For example, the multiplexer may in turn select the sensing signals of different photo sensors as the response signal to be transmitted to the signal amplifier.

In one embodiment, the measuring device further comprises a gain control unit. The gain control unit, coupled to the signal amplifier, adjusts a gain of the signal amplifier, so that a signal range of the first signal matches a dynamic range of the converter. For example, before measuring the response speed, the microcontroller controls the display panel via the control command to display a white frame (maximum grayscale), and measures the brightness of the white frame by the photo sensor to generate the corresponding sensing signal. If the sensing signal exceeds the dynamic range of the converter after the sensing signal is amplified by the signal amplifier, the gain control unit reduces the gain of the signal amplifier. If the sensing does not reach an upper limit of the dynamic range, the gain control unit increases the gain of the signal amplifier. In one embodiment, the signal amplifier may be an amplifier that controls the gain through a digital signal.

In one embodiment, the measuring device comprises a motherboard and an external daughterboard. The motherboard carries the microcontroller, the multiplexer, the signal amplifier, and the converter. The external daughterboard, coupled to the motherboard via a signal wire, carries the photo sensor. Different photo sensors may be installed to different external daughterboards. In one embodiment, the photo sensor may be installed to the external daughterboard in a swappable manner. By swapping different types of photo sensors, different characteristics may be measured and functions of the measuring device may also be augmented to satisfy later additional measuring requirements. In one embodiment, signal wires in different lengths may be utilized between the external daughterboard and the motherboard, so as to adapt to applications of differently-sized display panels and coordination of production requirements of factory production lines.

In one embodiment, the measuring device further comprises an interface port. The interface port is coupled to the microcontroller and is for typically connecting to a computer. The interface port receives the test command sent from the computer and transmits the test command to the microcontroller. The interface port may further output the measurement result of the measuring device to the computer. The computer can execute a test program to automatically control the measuring process.

According to another object the present invention, a method for measuring a response speed of a display panel is provided. The method is applied to a measuring device cooperating with a display controller to measure the display panel. The method comprises steps of: outputting a control command to the display controller to prompt the display controller to provide a test pattern to the display panel; sensing a test frame corresponding to the test pattern on the display panel by a photo sensor to generate a sensing signal associated with brightness; and outputting a response signal according to the sensing signal. The sensing signal is for calculating the response speed of the display panel.

In one embodiment, the control command is provided to the display controller according to a test command. The control command prompts the display controller to periodically provide a plurality of alternate test patterns.

In one embodiment, the display controller may receive an interrupt signal, which is associated with the timing of the test pattern and is for synchronizing the measuring device and the display controller.

In one embodiment, a second photo sensor may be utilized to sense a frame displayed by the display panel to generate a corresponding second sensing signal also associated with brightness. Further, a multiplexer is utilized for selectively outputting the response signal according to one of the sensing signal and the second sensing signal.

In one embodiment, the response speed of the display panel is calculated according to the test frame and the corresponding response signal.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
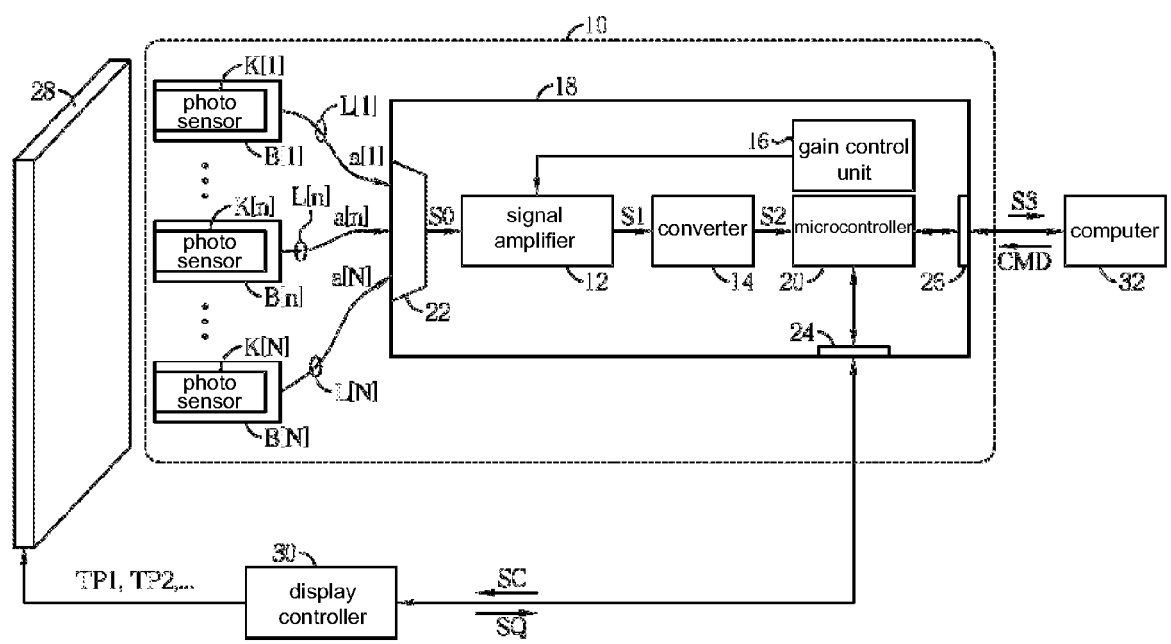
FIG. 1 is a schematic diagram of a measuring device according to one embodiment of the present invention.

FIG. 1 shows a schematic diagram of a measuring device according to one embodiment of the present invention. The measuring device 10 is for measuring characteristics of a display panel 28, e.g., a response speed. The display panel 28 is coupled to and controlled by a display controller 30, e.g., a display control chip. The measuring device 10 comprises N number of photo sensors K[n] (where n=1 to N, N is an integer greater than or equal to 1), a multiplexer 22, a signal amplifier 12, a converter 14, a gain control unit 16, and a microcontroller 20. The multiplexer 22, the signal amplifier 12, the converter 14, the gain control unit 16, and the microcontroller 20 may be installed to a motherboard 18. Each of the photo sensors K[n] may be installed onto an externally connected daughterboard B[n]. The daughterboards B[n] are coupled to the motherboard 18 via signal wires L[n] (where n=1 to N). The measuring device 10 further comprises interface ports 24 and 26 which are of arbitrary type, and potentially different from one another. It is to be understood that the invention is not limited to any specific types of ports for interfacing with other equipment.

In the measuring device 10, a computer 32 is coupled to the microcontroller 20 via the interface port 26 (e.g., a Universal Serial Bus (USB) port), allowing the microcontroller 20 to exchange data (e.g., digital data) with the computer 32. For example, the computer 32 is a personal computer capable of executing a test program to automatically control operations for measuring characteristics of the display panel. The interface port 26 may receive a test command CMD sent by the computer 32 and transmit the test command CMD to the microcontroller 20.

The measuring device 10 is coupled to the display controller 30 via the interface port 24, allowing the microcontroller 20 to exchange messages and information (e.g., digital messages and information) with the display controller 30. Using the interface port 24, the microcontroller 20 is coupled to the display controller 30, and provides a control command SC to the display controller 30 according to the test command CMD, such that the display controller 30 automatically provides one or multiple test patterns, e.g., test patterns TP1 and TP2, to the display panel 28 according to the control command SC. Each of the test pattern is for the display panel 28 to display an associated test frame. In one embodiment, the control command SC prompts the display controller 30 to automatically provide a series of periodical and alternate test patterns in different grayscales. In an alternative embodiment, when the display controller 30 sends a test pattern to the display controller panel 28, the display controller 30 also sends an interrupt signal SQ to the microcontroller 20 for indicating a timing of the associated test frame. That is, the interrupt signal SQ is associated with the timing of the test pattern. The microcontroller 20 receives the interrupt signal SQ from the display controller 30 via the interface port 24.

In one embodiment, the control command SC assigns a switching period T of the test frames generated by the display controller 30, red, green, and blue components of a first test frame, and red, green, and blue components of a second test frame. For example, the red, green, and blue components of the first test frame may all equal to a first value in response to a test frame in a first grayscale; the red, green, and blue components of the second test frame may all equal to a second value in response to a test frame in a second grayscale. The first and second grayscales may be different. In this embodiment, according to the switching period T assigned by the control command SC, the display controller 30 first provides a first test pattern for the display panel 28 to display the first test frame, and meanwhile sends an interrupt signal SQ to the microcontroller 20. After the period T, the display controller 30 provides a second test pattern for the display panel 28 to switch to display the second test frame, and meanwhile sends the interrupt signal SQ to the microcontroller 20. After another period T, the display controller 30 similarly provides the first test pattern to the display panel 28 and the interrupt signal SQ to the microcontroller 20. After yet another period T, the display controller 30 again provides the second test pattern to the display panel 28 and the interrupt signal SQ to the microcontroller 20. The above switching process iterates until the display controller 30 receives a next control command SC from the microcontroller 20. In one embodiment, the test pattern of the display controller 30 assigns the red, green and blue components of each pixel of the display panel 28. For example, the first test pattern renders specific pixels of the display panel to display a first grayscale and the remaining pixels to display a second grayscale. The second test pattern renders specific pixels of the display panel 28 to display a third grayscale and the remaining pixels to display a fourth grayscale.

The photo sensors K[n] are for sensing a frame displayed by the display panel 28. For example, photo sensors K[n] sense the brightness of a partial area of the display panel 28 and provide corresponding sensing signals a[n], where n=1 to N. In one embodiment, multiple photo sensors K[n] may be utilized for sensing the brightness generated at different positions of the same display panel. The multiplexer 22 is coupled between the photo sensors K[n] and the signal amplifier 12, and selectively in turn transmit the sensing signals a[n] of the different photo sensors K[n] to the signal amplifier 12. The sensing signal a[n] transmitted to the signal amplifier 12 is regarded as a response signal S0. According to a gain, the signal amplifier 12 adjusts the amplitude of the sensing signal a[n] (where n is one of 1 to N) selected by the multiplexer 22, i.e., the response signal S0, to generate a corresponding signal S1. The converter 14, coupled between the signal amplifier 12 and the microcontroller 20, converts the signal S1 to a signal S2, and transmits the signal S2 to the microcontroller 20. According to the signal S2, the microcontroller 20 provides a corresponding measurement result S3. For example, the sensing signal a[n] and the signal S1 are analog signals, the converter 14 is an analog-to-digital converter (ADC), the signal S2 is thus a digital signal, and the measurement result S3 is also digital data. The interface port 26 may also output the measurement result S3 of the measuring device 10 to the computer 32. According to the response signal S0 as well as the derived signal S2 or the measurement result S3, the microcontroller 30 and/or the computer 32 may calculate/compile the characteristics of the display panel 28, e.g., a response speed and/or response time.

In one embodiment, the measuring device 10 comprises the gain control unit 16 coupled to the signal amplifier 12. The gain control unit 16 adjusts the gain (i.e., the gain from the sensing signal a[n] to the signal S1) of the signal amplifier 12, in this way, a signal range of the signal S1 matches a dynamic range of the converter 14. To be specific, upper and lower limits of the dynamic range of a to-be-converted signal are associated with extreme (maximum and minimum) values of a corresponding converted signal. One way to envisage the advantage of adjusting the gain can be specified as follows. If the converted signal exceeds the dynamic range, the exceeding portion is truncated to the extreme value such that converted signal becomes distorted since changes in the truncated portion cannot be correctly followed. In contrast, when the signal swing (the signal range) of the to-be-converted signal is far less than the dynamic range, the conversion error (e.g., a quantization error) of the converted signal is increased. Thus, the signal range of the to-be-converted signal should match the dynamic range of the converter 14, so that the converted signal remains undistorted with a tolerable quantization error.

In one embodiment, for example, the signal amplifier 12 has a gain controlled by a digital signal. Correspondingly, the gain control unit 16 controls the gain of the signal amplifier 12 by a digital signal. The gain control unit 16 may be implemented by hardware, firmware, or software, and any combination thereof. For example, functions of the gain control unit 16 may be implemented by the microcontroller 20 through executing firmware. It should be noted that, in another embodiment, the gain of the signal amplifier may be predetermined, and so the gain control unit may be omitted in the measuring device. In other words, the gain control unit is an optional unit of the measuring device of the present invention.

Details of a measuring process that the measuring device 10 coordinates with the display controller 30 to measure characteristics (e.g., the response speed) of the display panel 28 are described below. The computer 32 sends an initial test command CMD to the measuring device 10 to start the measuring process. Before actually measuring the characteristics of the display panel 28, the microcontroller 20 controls the display controller 30 via the control command SC, so that the display controller 30 controls the display panel 28 to display a white frame in a highest grayscale (brightest). The photo sensors K[n] sense the brightness of the white frame to generate the corresponding sensing signals a[n]. If the signal S1 amplified by the signal amplifier 12 exceeds the dynamic range of the converter 14, the gain control unit 16 decreases the gain of the signal amplifier 12. After the current calibration, the signal range of the signal S1 matches the dynamic range of the converter 14 to fully exercise the digital conversion resolution of the converter 14.

After calibrating the gain of the signal amplifier 12, the computer 32 commands the microcontroller 20 via the test command CMD to start characteristic measuring, e.g., to test the response speed of the display panel 28 switching between the first grayscale and the second grayscale. The microcontroller 20 sends the corresponding control command SC to the display controller 30, such that the display panel 28 periodically and alternately displays the test frame in the first grayscale and the test frame in the second grayscale, and sends an interrupt signal SQ to the microcontroller 20 each time when switching between the test frames. When the display panel 28 displays the test frames, the photo sensors K[n] also perform the measuring. Based on the interrupt signal SQ, the microcontroller 20 is able to synchronize with the timing of the frame switching to control the outputs of the switching of the multiplexer 22 and the response signal S0, and to collect the signal S2 according to the timing of the frame switching to integrate into the measurement result S3. The measurement result S3 is transmitted back to the computer 32. When the test program of the computer 32 determines that enough measurement results has been obtained, another test command CMD, e.g., a test command for testing the response speed of the display panel 28 switching between a third grayscale and a fourth grayscale, is sent. According to the test command CMD, the microcontroller 20 sends another control command SC, such that the display controller 30 in response periodically and repeatedly switches between test frames in the third and fourth grayscales.

The microcontroller 20 of the measuring device 10 prompts the display controller 30 via only a single control command SC to periodically provide and switch between a plurality of different test frames according to an assigned period; thus, the measuring device 10 is suitable for testing of a high-frame rate display panel. Further, the high-frame rate display controller 30 is designed to provide the high-frame rate display panel 28 with high-frequency and high-speed frame data. Thus, the display controller 30 is capable of providing the fast-switching test frame data according to the high frame rate. That is to say, the microcontroller 20 of the measuring device 10 is not required to provide high-frequency and high-frame rate test frame data. Consequently, costs of the measuring device 10 can be reduced. The display controller 30 may execute appropriate firmware to decode and perform the control command SC of the microcontroller 20.

More importantly, the measuring device 10 effectively integrates the two key operations of "display panel control" and "frame quality measuring"—the display panel control is achieved through the control command SC, and the frame quality measuring is synchronously integrated according to the interrupt signal SQ. Via the test command from the computer 32, the characteristic measuring of the display panel can be automated to decrease human resources to further optimize overall performance of the display panel testing.

In one embodiment, the photo sensors K[n] are installed onto the external daughterboards B[n] in a swappable manner. By swapping different types of photo sensors, different characteristic measuring can be performed, so as to augment functions of the measuring device 10 and to satisfy later additional measuring requirements. For example, with photo sensors equipped with filter lenses, the brightness of a particular component (e.g., red component) of the display panel can be measured. In one embodiment, the external daughterboards B[n] and the motherboard 18 may be connected by signal wires L[n] in different lengths, so as to adapt to applications of differently-sized display panels and coordination of production requirements of factory production lines. For example, to test a display panel of a larger size, a longer signal wire L[n] can be utilized. Further, a larger number of photo sensors K[n] can be employed for testing more positions of the display panel.

Figure 2:
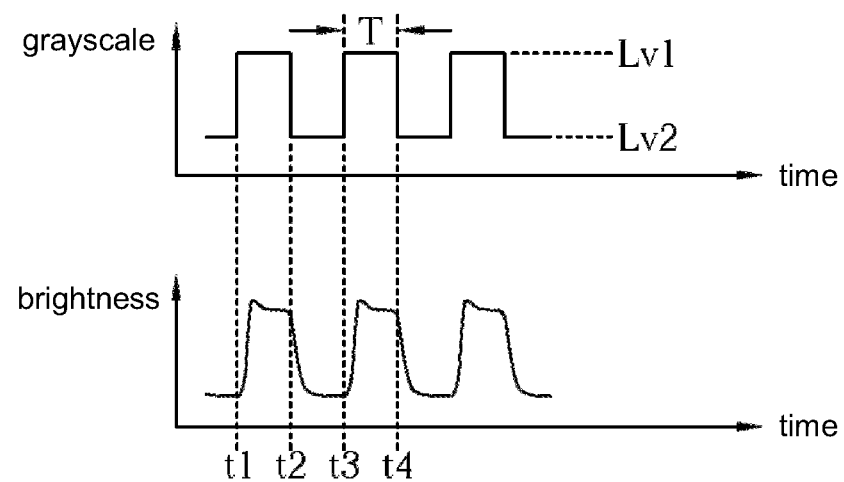
FIG. 2 is a schematic diagram of a measuring operation performed by the measuring device in FIG. 1.

FIG. 2 shows a schematic diagram of a panel characteristic measuring according to one embodiment of the present invention. Under the control of the microcontroller 20, the display controller 30 automatically prompts the display panel 28 to repetitively switch between testing frames in grayscales Lv1 and Lv2. For example, the test frame in the grayscale Lv1 is displayed at a time t1, the test frame in the grayscale Lv2 is displayed at a time t2, the test frame in the grayscale Lv1 is displayed at a time t3, the test frame in the grayscale Lv1 is displayed at a time t4, and so forth. A time interval between the time points t1, t2, t3, and t4 is a uniform period T.

Correspondingly, the photo sensors K[n] can measure the actual brightness generated by the display panel 28. The response speed can be deduced from changes in the brightness, so that the display controller 30 is allowed to compensate the defects in the response speed. The microcontroller 20 can assign values of the grayscales Lv1 and Lv2 and a length of the period T through the control command SC, and a timing of the time points t1 to t4 may be obtained from the interrupt signal SQ.

In conclusion, compared the conventional measuring techniques for display panel characteristics, the measuring technique of the present invention effectively integrates display panel control and frame quality measuring while also reduces costs of the measuring device. In addition, the measuring technique of the present invention offers high-degree automation for significantly reducing human resources and costs required for testing. Furthermore, the measuring device of the present invention is highly flexible and augmentable for adapting to display characteristic measuring of various types of display panels having different frame rates and different sizes.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A measuring device, for measuring a response speed of a display panel, the display panel being coupled to a display controller, the measuring device comprising:
   a microcontroller, coupled to the display controller, for providing a control command to the display controller, such that the display controller provides a test pattern to the display panel according to the control command; and
   a first photo sensor, for sensing a test frame associated with the test pattern on the display panel to provide a first sensing signal, which is associated with a brightness and a response signal for calculating the response speed of the display panel,
   wherein the microcontroller further receives an interrupt signal from the display controller, and the interrupt signal is associated with a timing of the test pattern for synchronizing the measuring device with the display controller.

2. The measuring device according to claim 1, wherein the control command prompts the display controller to periodically and alternately provide a plurality of the test patterns.

3. The measuring device according to claim 1, further comprising:
   a multiplexer, coupled to the first photo sensor; and
   a second photo sensor, coupled to the multiplexer, for sensing the test frame associated with the test pattern on the display panel, and providing a corresponding second sensing signal associated with the brightness;
   wherein, the multiplexer selectively relates one of the first sensing signal and the second sensing signal to the response signal and transmits the selected signal to the microcontroller.

4. The measuring device according to claim 1, further comprising:
   a signal amplifier, coupled to the first photo sensor, for adjusting an amplitude of the first sensing signal to generate a first signal;
   a converter, coupled between the signal amplifier and the microcontroller, for converting the first signal to a second signal and transmitting the second signal to the microcontroller; and
   a gain control unit, coupled to the signal amplifier, for adjusting a gain of the signal amplifier to match a signal range of the first signal to a dynamic range of the converter.

5. The measuring device according to claim 4, wherein the first signal and the second signal are respectively an analog signal and a digital signal, and the converter is an analog-to-digital converter (ADC).

6. The measuring device according to claim 4, further comprising:
   a motherboard, carrying the microcontroller, the signal amplifier and the converter; and
   an external daughterboard, coupled to the motherboard, carrying the first photo sensor.

7. The measuring device according to claim 6, wherein the first photo sensor is installed onto the external daughterboard in a swappable manner.

8. The measuring device according to claim 1, further comprising:
   an interface port, coupled to the microcontroller, for receiving the control command.

9. The measuring device according to claim 4, the microcontroller further providing a corresponding measurement result according to the second signal, the measuring device further comprising:
an interface port, for outputting the measurement result.

10. A method for measuring a response speed of a display panel using a measuring device, coupled to a display controller, the method comprising:
providing a microcontroller, coupled to the display controller;
providing a first photo sensor;
issuing a control command by the microcontroller to the display controller, prompting the display controller to provide a test pattern to the display panel according to the control command;
sensing a test frame corresponding to the test pattern on the display panel by the first photo sensor to generate a corresponding first sensing signal associated with a brightness;
outputting a response signal for calculating the response speed of the display panel; and
receiving an interrupt signal from the display controller by the microcontroller, wherein the interrupt signal is associated with a timing of the test pattern for synchronizing the measuring device with the display controller.

11. The method according to claim 10, further comprising providing the control command to the display controller according to a test command, wherein the control command prompts the display controller to periodically and alternately provide a plurality of the test patterns.

12. The method according to claim 10, further comprising:
providing a multiplexer, coupled to the first photo sensor;
providing a second photo sensor, coupled to the multiplexer;
sensing a the test frame associated with the test pattern displayed by the display panel to generate a corresponding second sensing signal associated with the brightness; and
selectively outputting the response signal according to one of the first sensing signal and the second sensing signal.

13. The method according to claim 10, wherein the response speed of the display panel is calculated according to the test frame and the response signal.

14. The method according to claim 10, further comprising:
providing a signal amplifier, coupled to the first photo sensor;
providing a converter, coupled between the signal amplifier and the microcontroller;
providing a gain control unit, coupled to the signal amplifier;
adjusting an amplitude of the first sensing signal with the signal amplifier to generate a first signal;
converting the first signal to a second signal with the converter;
transmitting the second signal to the microcontroller; and
adjusting a gain of the signal amplifier with the gain control unit to match a signal range of the first signal to a dynamic range of the converter.

15. The method according to claim 14, wherein said converting step is an analog-to-digital conversion.

16. The method according to claim 14, further comprising:
installing said first photo sensor onto an external daughterboard in a swappable manner.

17. The method according to claim 14, further comprising:
providing a corresponding measurement result according to the second signal with the microcontroller; and
outputting the measurement result with an interface port.

* * * * *